(12) United States Patent
Arnell et al.

(10) Patent No.: US 10,749,895 B2
(45) Date of Patent: Aug. 18, 2020

(54) HANDLING NETWORK THREATS

(71) Applicant: Hewlett Packard Enterprise Development LP, Houston, TX (US)

(72) Inventors: Simon Ian Arnell, Aldershot (GB); Marco Casassa Mont, Bristol (GB); Yolanta Beresna, Bristol (GB); Theofrastos Koulouris, Bristol (GB); Jon Potter, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 147 days.

(21) Appl. No.: 15/777,185

(22) PCT Filed: Nov. 17, 2015

(86) PCT No.: PCT/US2015/061031
§ 371 (c)(1),
(2) Date: May 17, 2018

(87) PCT Pub. No.: WO2017/086928
PCT Pub. Date: May 26, 2017

(65) Prior Publication Data
US 2018/0337943 A1 Nov. 22, 2018

(51) Int. Cl.
*H04L 29/06* (2006.01)
*H04L 12/22* (2006.01)
*H04L 12/24* (2006.01)

(52) U.S. Cl.
CPC .......... *H04L 63/1441* (2013.01); *H04L 12/22* (2013.01); *H04L 41/08* (2013.01); *H04L 63/1416* (2013.01); *H04L 63/1425* (2013.01)

(58) Field of Classification Search
CPC ..... H04L 12/22; H04L 41/08; H04L 63/1416; H04L 63/1441
See application file for complete search history.

(56) References Cited

U.S. PATENT DOCUMENTS 7,322,044 B2 * 1/2008 Hrastar ............... H04L 41/0893
726/22
7,324,804 B2 * 1/2008 Hrastar ............... H04L 63/1416
370/447
(Continued)

FOREIGN PATENT DOCUMENTS

CN 102299909 A 12/2011
CN 104115463 A 10/2014
(Continued)

OTHER PUBLICATIONS

Search Query Report from IP.com (performed Apr. 24, 2020).*
(Continued)

*Primary Examiner* — Sharon S Lynch
(74) *Attorney, Agent, or Firm* — Hewlett Packard Enterprise Patent Department

(57) ABSTRACT

Examples relate to handling network threats. In one example, a computing device may: receive, from a threat detector, threat data associated with a particular network device included in a plurality of network devices; identify, based on the threat data, a particular analytics operation for assisting with remediation of a threat associated with the threat data; identify, based on the threat data, additional data for performing the particular analytics operation; cause reconfiguration of at least one of the plurality of network devices, the reconfiguration causing each of the reconfigured network devices to i) collect the additional data, and ii) provide the additional data to an analytics device; and receive, from the analytics device, particular analytics results of the particular analytics operation.

15 Claims, 3 Drawing Sheets

(56) References Cited

U.S. PATENT DOCUMENTS

| | | | |
|---|---|---|---|
| 8,010,993 B1* | 8/2011 | Bartholomay | H04L 63/10 726/1 |
| 8,413,247 B2 | 4/2013 | Hudis et al. | |
| 8,856,926 B2* | 10/2014 | Narayanaswamy | H04L 63/1425 726/23 |
| 8,856,936 B2* | 10/2014 | Datta Ray | H04L 63/1433 726/25 |
| 9,092,616 B2 | 7/2015 | Kumar et al. | |
| 9,112,899 B2* | 8/2015 | Baccas | G06F 21/56 |
| 9,203,806 B2* | 12/2015 | Ahn | H04L 41/16 |
| 9,413,722 B1* | 8/2016 | Ahn | H04L 63/0263 |
| 9,674,148 B2* | 6/2017 | Ahn | G06N 5/02 |
| 9,866,576 B2* | 1/2018 | Ahn | H04L 63/0263 |
| 9,917,856 B2* | 3/2018 | Ahn | H04L 61/1511 |
| 10,027,689 B1* | 7/2018 | Rathor | G06F 11/3006 |
| 10,193,917 B2* | 1/2019 | Ahn | H04L 63/0263 |
| 10,284,522 B2* | 5/2019 | Ahn | G06N 5/02 |
| 2003/0212903 A1* | 11/2003 | Porras | H04L 41/142 726/13 |
| 2004/0098610 A1* | 5/2004 | Hrastar | H04L 41/0893 726/1 |
| 2004/0218602 A1* | 11/2004 | Hrastar | H04L 63/1416 370/390 |
| 2005/0235360 A1* | 10/2005 | Pearson | H04L 29/06 726/23 |
| 2005/0278784 A1* | 12/2005 | Gupta | H04L 63/145 726/23 |
| 2009/0178139 A1 | 7/2009 | Stute et al. | |
| 2009/0328219 A1* | 12/2009 | Narayanaswamy | H04L 63/1425 726/23 |
| 2011/0072506 A1 | 3/2011 | Law et al. | |
| 2011/0178933 A1 | 7/2011 | Bailey, Jr. | |
| 2013/0086680 A1 | 4/2013 | Hershey et al. | |
| 2013/0333040 A1* | 12/2013 | Diehl | G06F 21/568 726/24 |
| 2014/0025794 A1* | 1/2014 | Bartholomay | H04L 63/0227 709/221 |
| 2014/0109226 A1* | 4/2014 | Diehl | H04L 63/1491 726/24 |
| 2014/0137188 A1* | 5/2014 | Bartholomay | H04L 65/40 726/3 |
| 2014/0201123 A1* | 7/2014 | Ahn | G06N 5/02 706/47 |
| 2014/0237542 A1* | 8/2014 | Baccas | G06F 21/56 726/1 |
| 2014/0258446 A1* | 9/2014 | Bursell | G06F 15/177 709/217 |
| 2014/0304765 A1* | 10/2014 | Nakamoto | H04L 63/20 726/1 |
| 2014/0325649 A1 | 10/2014 | Zhang | |
| 2015/0033353 A1* | 1/2015 | Oliphant | G06F 21/577 726/25 |
| 2015/0089566 A1 | 3/2015 | Chesla | |
| 2015/0244678 A1 | 8/2015 | Stevens et al. | |
| 2015/0244679 A1* | 8/2015 | Diehl | G06F 21/568 726/23 |
| 2015/0358355 A1* | 12/2015 | Bartholomay | H04L 63/0227 726/1 |
| 2016/0134491 A1* | 5/2016 | Cordray | H04L 41/0213 709/224 |
| 2016/0134653 A1* | 5/2016 | Vallone | H04L 63/1433 726/25 |
| 2016/0171102 A1* | 6/2016 | Pandya | G06F 16/90344 707/712 |
| 2016/0197882 A1* | 7/2016 | Ahn | H04L 63/0263 709/221 |
| 2018/0115518 A1* | 4/2018 | Ahn | H04L 63/0263 |

FOREIGN PATENT DOCUMENTS

| | | |
|---|---|---|
| CN | 104272656 A | 1/2015 |
| CN | 104468636 A | 3/2015 |
| WO | 2017086924 A1 | 5/2017 |

OTHER PUBLICATIONS

International Search Report and Written Opinion received for PCT Patent Application No. PCT/US2015/061031, dated Aug. 8, 2016, 11 pages.

European Search Report and Search Opinion Received for EP Application No. 15908924.2, dated May 22, 2019, 8 pages.

EMC; Implementing a Security Analytics Architecture; http://www.emc.com/collateral/solution-overview/11737-87640-h9093-imosa-sb.pdf ; 2012, 6 Pgs.

Hewlett-Packard Development Company, L.P., "ArcSight Threat Response Manager," Apr. 18, 2014, 4 Pgs., http://web.archive.org/web/20140418220158/http://www8.hp.com/us/en/software-solutions/software.html?compURI=1418952#.V3PjffkrJhE>.

Hewlett-Packard Development Company, L.P., "Respond to network incidents in seconds, not days: HP ArcSight Threat Response Manager," Aug. 2011, 2 Pgs., <http://web.archive.org/web/201407181022220/http://h71028.www7.hp.com/enterprise/downloads/software/ESP-PRB009-101209-02.pdf>.

* cited by examiner

HANDLING NETWORK THREATS

BACKGROUND

Computer networks and the devices that operate on them often experience problems for a variety of reasons, e.g., due to misconfiguration, software bugs, and malicious network and computing device attacks. In a network services industry, e.g., where a service provider provides computing resources operating on a private network for use by various users, the size and complexity of a private network may make detecting and handling problems with the network difficult. A compromised computing device, for example, may operate in a malicious manner within a private network for a significant period of time before the malicious activity can be identified and handled.

BRIEF DESCRIPTION OF THE DRAWINGS

The following detailed description references the drawings, wherein.

DETAILED DESCRIPTION

Figure 1:
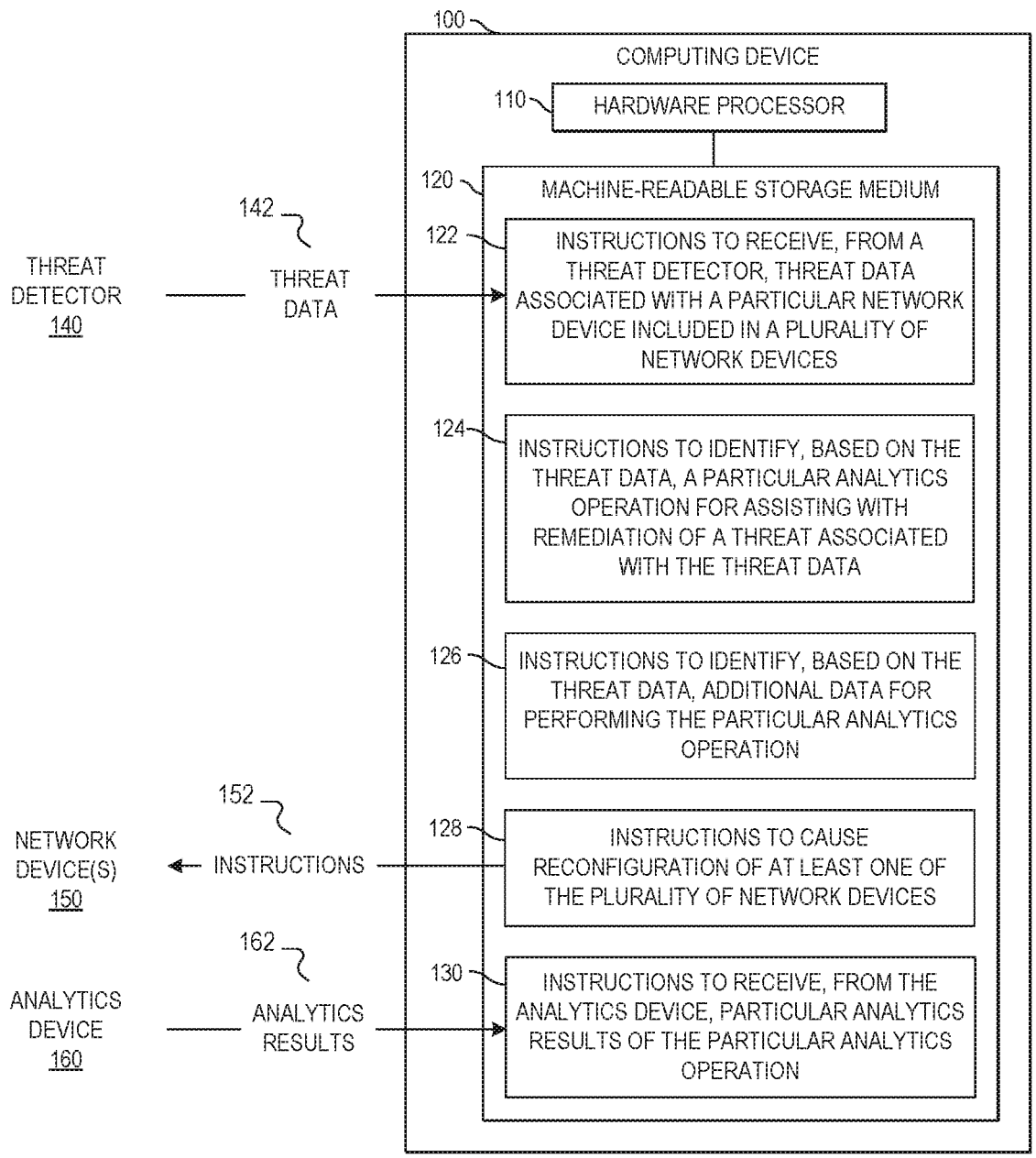
FIG. 1 is a block diagram of an example computing device for handling network threats.

Potentially problematic network activity occurring on network devices may be detected in a variety of ways. For example, signatures of malicious code may be identified in network communications, the source or destination of network packets may be identified and determined to be sourced from or destined for a device that is known to be malicious, and/or patterns in network traffic may be detected that are indicative of malicious activity. When a potential threat is identified, a threat handling device may be provided with information related to the threat, so that the threat may be handled in a manner designed to ensure the security of the network.

The threat handler may determine, based on the information provided to it, one or more types of analytics that are to be performed in order to determine more information about the threat and/or to determine how to remediate the threat. In some implementations, the threat handler may use preconfigured playbooks, e.g., preconfigured instructions, to determine how the threat handler proceeds given the particular threat information. Playbooks include data associating a threat or threats with one or more analytics operations that may be used to analyze and/or remediate the threats and one or more types of information used to perform the analytics operations. Playbooks may be implemented in, for example, a list, table, or the like, or other data structure including the associated data, executable instructions for performing analytics and obtaining the information used to perform the analytics, or specification documents that include the associated data. The threat handler may, for example, cause various network devices to collect data that can be used to perform particular analytics, the results of which may be used to identify the specific threat occurring on the network. After identifying a specific threat, the threat handler may, e.g., using the playbook, determine how the threat should be remediated, e.g., by providing a network controller with instructions to shut down affected devices.

By way of example, a DNS analytics device may identify an anomaly in the DNS traffic sent by a particular computing device on a network. An alert, which may contain information about the anomaly, may be sent to the threat handler. The threat handler may use a playbook to determine that specific analytics should be performed to obtain more information about the threat. The specific analytics may make use of additional information not currently being collected or reviewed within the network, such as web proxy logs, user activity logs, and/or TCP/IP network samples and counters. The threat handler may notify a network device controller, such as software defined network (SDN) controller, to instruct one or more network devices, such as SDN routers and switches, to collect the additional information. The threat handler may also instruct an analytics devices to perform the specific analytics. When the analytics device receives the additional information from the reconfigured network devices, the specific analytics may be performed, with the results being provided to the threat handler. Based on the results of the specific analytics, the threat handler may determine further analytics to be performed and/or remedial actions to be taken to remedy specific threats. For example, the threat handler may determine, based on the results of the specific analytics, that a computing device on the network is infected with malware, and it may further determine that network communications to and from the affected computing device should be prevented until the malware can be removed.

The ability to handle network threats in the above described manner may facilitate relatively efficient identification and remediation of network threats. For example, resource intensive data collection and analytics techniques may be reserved for use in response to identification of particular potential threats that may be identified using relatively lightweight collection and analytics. In addition, a variety of playbooks for determining analytics and remedial actions may allow for handling potential threats in a variety of ways, and the ability to create new playbooks or change existing playbooks may allow network administrators to adapt to new threats and manage many threat handling procedures at a single point in the network. The manner in which network threats may be handled is described in further detail in the paragraphs that follow.

Referring now to the drawings, FIG. 1 is a block diagram of an example computing device 100 for handling network threats. Computing device 100 may be, for example, a server computer, a personal computer, a mobile computing device, or any other electronic device suitable for processing network communications data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-130, to control the process for handling network threats. As an alternative or in addition to retrieving and executing instructions, hardware processor 110 may include one or more electronic circuits that include electronic components for performing the functionality of one or more of instructions. The functionalities described herein in relation to instructions 122-130 may, in some implementations, be implemented as engines comprising hardware or combination of hardware and programming to implement the functionalities of the engines.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for handling network threats.

The example environment depicted in FIG. 1 also includes a threat detector 140, network devices 150, and an analytics device 160. The threat detector 140 is a computing device that provides threat data 142 to the computing device 100. The threat detector may be, for example, an analytics devices that performs analytics on network communications or other information to determine if a potential threat exists within the network. Another example threat detector 140 is a network router that includes logic for identifying a particular threat and, upon identification of the particular threat, sending threat data to the computing device 100. In some implementations, a variety of threat detectors, of the same or differing types, may be used to identify potential threats to the network and/or the devices operating on the network.

Network devices 150 depicted in FIG. 1 may include any number of network devices capable of receiving instructions 152, directly or indirectly, from the computing device 100. For example, the network devices 150 may include multiple SDN switches and routers that are capable of being configured to collect and send particular information from the network packets as they traverse the network devices 150. Other types of network devices 150 may include, for example, end-point devices such as content servers and user devices, analytics devices, event control devices, network tap devices, and other devices capable of communicating with the computing device 100.

The analytics device 160 may be one or more computing devices designed to provide analytics results 162 to the computing device 100. Analytics may be used, for example, to identify and communicate patterns—found within input data—that may indicate malicious or potentially malicious activity. A network may include multiple analytics devices, each capable of performing its own analytics operations and/or working with other analytics devices to perform one analytics operation. The analytics performed by the analytics device 160 may vary; e.g., the input, output, and particular analytics operations performed may be configured by the computing device 100.

As shown in FIG. 1, the computing device 100 executes instructions (122) to receive, from a threat detector 140, threat data 142 associated with a particular network device included in a plurality of network devices. For example, a threat detector 140 may be a network packet capture device that sends an alert when a particular end-point computing device, such as a server computer, is uploading a threshold amount of data out of the network over a certain period of time. The alert may be sent to the computing device 100, along with threat data 142 that includes some information about the potential threat, e.g., the amount of data transferred. In some implementations, a variety of threat detectors may be used to provide a variety of different types of threat data to the computing device.

The computing device 100 executes instructions (124) to identify, based on the threat data 142, a particular analytics operation for assisting with remediation of a threat associated with the threat data 142. Using the example above, a potential threat may be a malicious entity causing sensitive data stored on the end-point device to be uploaded to the malicious entity. Example analytics operations may include an analysis of the intended destination(s) of the uploaded data and/or an analysis of the type(s) of data being uploaded. In some implementations, the computing device 100 may use predefined playbooks for determining analytics operation(s) that may be useful to determine more information about a potential threat and/or to determine how to remediate the potential threat. For example, a particular playbook may specify that, in response to identifying a large amount of data being uploaded from an end-point device to an external entity, analytics should be performed to determine whether the destination of the uploaded data is associated with a known malicious entity. Playbooks may be configured in a variety of ways, e.g., multiple playbooks may be associated with one potential threat, some playbooks may specify multiple analytics operations, and some playbooks may be designed to be used in response to identifying a particular combination of potential threats.

The computing device 100 executes instructions (126) to identify, based on the threat data 142, additional data for performing the particular analytics operation. For example, an analytics operation designed to determine whether the data being uploaded is indicative of a compromised system may use file extension information included in network packets to determine the likelihood that the system is compromised. As another example, an analytics operation used to determine whether network traffic is destined for a known malicious entity may use destination information included in network packets and/or source information included in incoming network packets associated with upload requests. The additional data may be a type of data not currently being collected by the network, e.g., the additional data may be different from the data being collected when the original potential threat was identified. In implementations where playbooks are used to determine analytics operations, playbooks may also specify the additional data used to perform the analytics operations.

The computing device 100 executes instructions (128) to cause reconfiguration of at least one of the plurality of network devices 150. Reconfiguration causes each reconfigured network device to i) collect the additional data, and ii) provide the additional data to an analytics device, such as analytics device 160. For example, the computing device 100 may provide instructions 152, directly or indirectly, to a network switch or packet capturing device, to instruct the device to capture the type(s) of data being uploaded from the potentially compromised server computer and send the captured information to an analytics device. In some implementations, the computing device 100 may provide reconfiguration instructions 152 to a separate controller device designed to reconfigure network devices 150. For example, in the SDN context, an SDN network controller may be capable of causing SDN network elements, such as SDN switches and routers, to be reconfigured for capturing and transmitting specific data of interest. In this context, the computing device 100 may provide information to the SDN controller that specifies the additional data to be collected and sent to a particular analytics device or devices, and the SDN controller will provide the appropriate SDN devices with data that causes reconfiguration of the SDN devices.

In some implementations, the computing device 100 may execute instructions to provide instructions to an analytics device, such as analytics device 160, the instructions causing the analytics device to perform the particular analytics. For example, the computing device 100 may provide the analytics device 160 with instructions to perform the particular analytics using the additional data that is being captured and provided by the reconfigured network devices.

The computing device 100 executes instructions (130) to receive, from the analytics device 160, particular analytics results 162 of the particular analytics operation. For example, the analytics results may indicate a measure of likelihood that the server computer is compromised by a malicious actor. In some implementations, the computing device 100 may determine to perform additional analytics based on the analytics results, e.g., in situations where the results were not conclusive enough to determine whether a potential threat is a false positive or an actual threat. In some implementations, a playbook may specify subsequent analytics to be performed. In some implementations, the computing device 100 may identify a new playbook to be used to identify additional analytics and data to be captured.

In situations where additional analytics are to be performed, the computing device 100 may cause reconfiguration of at least one of the network devices. The reconfigured network devices may be the same devices reconfigured in the first round of analytics and/or different network devices. The second analytics results may be determined by the same analytics device 160 and/or different analytics devices. The second results may be used to determine whether the threat is a false positive or indicative of an actual threat. The process for reconfiguring network devices, gathering additional data, and performing other analytics, may be repeated, e.g., until the computing device 100 has the information needed to determine how to handle the potential threat.

In situations where the computing device 100 determines. e.g., based on analytics results, that a threat is not a false positive—or is not likely to be a false positive—the computing device 100 may initiate remedial measures in a variety of ways. The computing device 100 may notify an administrator, notify a user associated with an affected device, instruct network devices to restrict communications to/from the affected device, or instruct a network device controller to restrict communications involving the affected device, to name a few. In implementations where playbooks are used, playbooks may include one or more remedial measures that may be taken in response to determining that a threat is real or likely to be real. By way of example, in a situation where the computing device 100 determines that a server computer on the network is infected with malware that is causing the server computer to upload data, the computing device 100 may instruct an SDN controller to cause SDN switches or routers within the network to prevent transmission of network packets sent by the server computer.

While the threat detector 140 and analytics device 160 are depicted separately from the computing device 100 in FIG. 1, in some implementations the actions performed by each device may be executed by a single computing device, e.g., computing device 100. In addition, the instructions executed by the computing device 100 need not be performed by a single device and may be performed by multiple computing devices. Other computing device configurations and/or combinations of devices may also be used to execute instructions for handling network threats.

Figure 2:
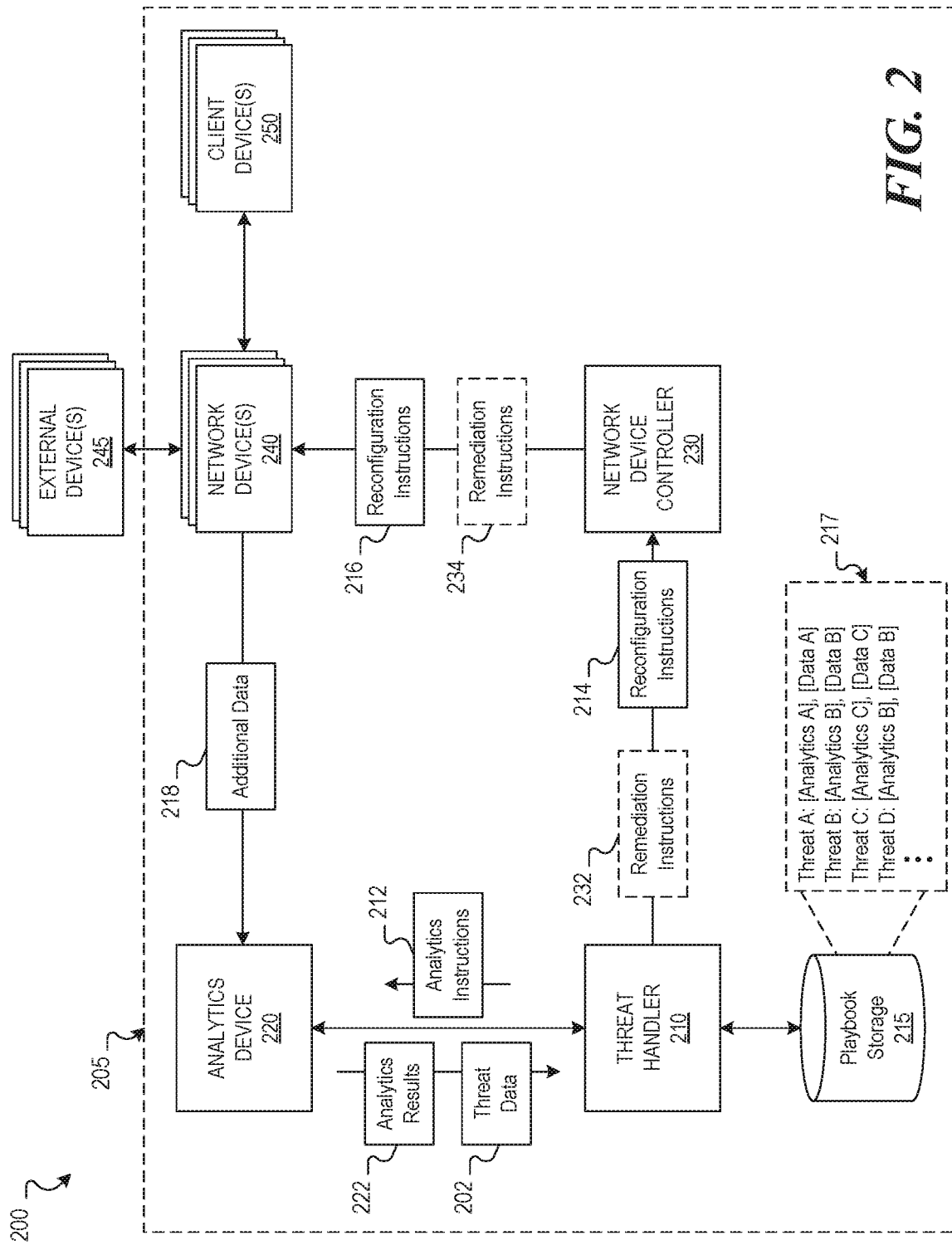
FIG. 2 is an example data flow for handling network threats.

FIG. 2 is an example data flow 200 for handling network threats. The data flow depicts a threat handler 210, which may be implemented by a computing device, such as the computing device 100 described above with respect to FIG. 1. The network device(s) 240 may be any intermediary network device suitable for transmitting network communications within and outside of the network 205, such as routers and switches, software defined or otherwise, and virtual or hardware. The client device(s) 250 may be any end-point computing device suitable for network communications, such as a personal computer, mobile computer, virtual machine, server computer, or any combination thereof. For example, the client computing device(s) 250 may be virtual machines operating within a private cloud computing network 205 and managed by a user external to the private network 205. The network device controller 230 may be one or more computing devices that manage the network device(s) 240. For example, in the SDN context, the network device controller 230 may be a SDN network controller. The analytics device 220 may be one or more computing devices for analyzing network data for various purposes, e.g., to identify potential threats, patterns, network traffic information, and various metrics.

During their operation, the client device(s) 250 may communicate with other devices, e.g., devices internal to the network 205 and external devices 245, using the network device(s) 240, e.g., routers and switches. The network device controller 230 manages the operation, monitoring, and/or configuration of the network device(s) 240, e.g., in the SDN context, the network device controller 230 may be a SDN controller that controls the configuration of SDN network devices. The analytics device 220 may perform a variety of analytics based on data received from one or more sources within the network 205. For example, individual network devices 240 may be configured to send information related to DNS traffic to the analytics device 220, which may perform analytics on the information to determine potential problems, or threats, are occurring within any of the devices operating on the network 205.

In the example data flow 200, the analytics device 220 sends threat data 202 to the threat handler 210. The threat data 202 may be, for example, an alert regarding an anomaly in DNS requests sent by a particular client device. The threat data 202 may specify that a particular client device operating on the network 205 is sending DNS queries at a rate that exceeds a threshold that indicates, based on analytics, a potential malware infection—on the particular client device.

The threat handler 210, using the threat data 202, identifies a particular analytics operation for assisting with remediation of the potential threat and additional data to be used for performing the analytics operation. For example, the threat handler 210 may identify one playbook from a group of playbooks 217 stored on a playbook storage 215 device. The example playbooks indicate, for each of several different threats—threats A, B, C, and D—analytics operation(s) and data used for performing the analytics operation(s). For example, in a situation where the threat data 202 specifies a threat associated with "threat C," the threat handler 210 may use the playbook associated with "threat C" to determine that "analytics C" should be performed to determine how to remediate the potential threat associated with "threat C," and that "data C" should be gathered in order to perform "analytics C." In the DNS query threshold example, the threat may be malware on the client device that uses a high volume of pseudo-random DNS queries to find malware command and control devices. Analytics to be performed may use web proxy logs, user activity logs, and TCP/IP network samples and counters to further investigate and determine a root cause of the problem and potential steps for remediation.

After identifying the analytics to be performed and additional data to be collected, the threat handler 210 sends analytics instructions 212 to the analytics device 220 and reconfiguration instructions 214 to the network device controller 230. The analytics instructions 212 may specify, for example, which analytics operation(s) should be performed by the analytics device 220. The reconfiguration instructions 214 may specify, for example, the additional data to be gathered for performing the analytics.

The network device controller 230, in response to receiving the reconfiguration instructions 214, causes reconfiguration of at least one of the network devices 240. The reconfiguration instructions 216 provided by the network device controller may be the same instructions, or different instructions, from those provided by the threat handler 210. For example, the reconfiguration instructions 214 sent by the threat handler 210 may specify the additional data to be collected, while the reconfiguration instructions 216 sent by the network device controller 230 may be more specific instructions for multiple network devices 240. In the SDN context, reconfiguration instructions provided by the SDN controller will cause reconfiguration of hardware and/or software on individual SDN network devices.

The reconfigured network devices 240 send, to the analytics device 220, the additional data 218 captured as a result of their reconfiguration. In the DNS query threat example, one or more of the network devices 240 may be reconfigured to send, to the analytics device 220, web proxy logs, user activity logs, and TCP/IP network samples and counters of the affected client device and, in some implementations, other client devices.

The analytics device 220 performs analytics using the additional data 218. The actual analytics operation(s) performed may vary. In the example above, an analytics operation may be performed on the additional data 218 to determine the likelihood that the additional data 218 supports a pattern of communications associated with a particular type of malware. Analytics results 222 are sent from the analytics device 220 to the threat handler 210. The results 222 may specify a variety of information, such as an additional threat, likelihood of an additional threat, likelihood of other client devices being affected, and/or a prediction regarding the existing threat, to name a few.

In response to receiving the analytics results 222, the threat handler 210 may take a variety of actions. For example, the threat handler 210 may follow instructions included in the playbook used for the original threat, identify one or more additional playbooks for handling of newly identified threats, notify a system administrator of a threat or potential threat, take remedial action designed to stop a threat, and/or end collection of additional data in situations where a potential threat was a false positive.

In the example data flow 200, the threat handler 210 provides remediation instructions 232 to the network device controller 230 for remediating the threat. The remediation instructions 232 may, for example, have been included in a playbook or provided by a system administrator. The network device controller 230 uses the remediation instructions 232 to provide its own remediation instructions 234 to the network devices 240. The remediation instructions 234 sent by the network device controller may include reconfiguration data used to cause reconfiguration of at least one network device 240. Using the DNS query malware example above, and in the SDN context, the threat handler 210 may instruct the SDN controller to halt all outgoing traffic from the affected client device and enable collection of new data from different client devices that may be at risk. The SDN controller may then cause reconfiguration of one or more of the network devices to prevent outgoing communications from the affected client device and to collect the additional information to be used to verify the status of other at-risk client devices.

The analytics performed, data collected, network device reconfigurations, and remedial actions may be iteratively adjusted throughout the process for handling potential network threats. When a threat is fully handled, e.g., malware or affected client device(s) removed, the network data collection and analytics may return to a default state, e.g., a less resource-intensive collection and analysis of DNS data only. The threat handler 210 may also, in some implementations, assist in handling multiple threats in parallel, e.g., using playbooks, administrator instructions, or a combination thereof. For example, when faced with two different types of threats, network devices may be reconfigured to collect data for one or both, at the same time or according to a priority associated with the threats, and analytics for multiple threats may be performed, at the same time or according to the same or a different priority. As noted above, device configurations other than the one depicted in the example data flow 200 may be used in a system that handles network threats, e.g., by combining the threat handler 210 and network device controller 230.

Figure 3:
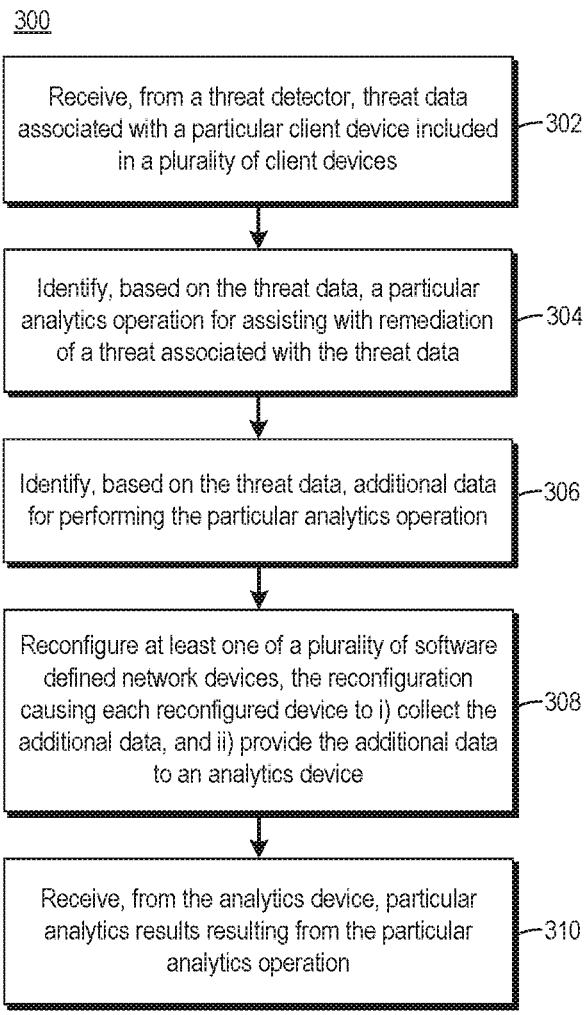
FIG. 3 is a flowchart of an example method for handling network threats.

FIG. 3 is a flowchart of an example method 300 for handling network threats. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry.

Threat data associated with a particular client device included in a plurality of client devices is received from a threat detector (302). The threat detector may be, for example, an intermediary network device, an analytics device, a client device, or a user. The threat data may specify a type of threat, network anomaly information, and or symptoms of one or more devices operating on a network with a threat handler.

Based on the threat data, a particular analytics operation is identified for assisting with remediation of a threat associated with the threat data (304). In some implementations, a responsive playbook is identified from a set of predefined playbooks, each predefined playbook including instructions for handling threat data. The responsive playbook, e.g., identified based on the threat data matching a threat associated with the playbook, may specify which particular analytics operation(s) are to be performed.

Based on the threat data, additional data for performing the particular analytics operation is identified (306). The additional data is a type of data not being collected, by the plurality of network devices, at the time of receipt of the threat data. For example, the responsive playbook may specify additional data, not currently being collected by SDN devices, that may be used by an analytics device to determine more information about the threat indicated by the threat data.

At least one of a set of SDN devices is reconfigured, the reconfiguration causing each reconfigured device to i) collect the additional data, and ii) provide the additional data to an analytics device (308). For example, reconfiguration instructions may be issued to a SDN switch to reconfigure the switch to send certain types of network packets from a particular client device to an analytics device.

Particular analytics results resulting from the particular analytics operation are received from the analytics device (310). For example, the analytics device may, upon receipt of the additional data, perform the particular analytics operation and send the results to the threat handler.

In some implementations that make use of playbooks, a second playbook may be identified from the predefined set of playbooks, the second playbook being different from the original responsive playbook. One or more of the SDN devices may be reconfigured again to collect secondary data specified by the second playbook. A second analytics operation may be performed, and second analytics results may be received. The additional analytics and data gathering may allow a threat handler to iteratively manage a network to obtain information about multiple threats. The information gathered by the threat handler may, in some implementations, be used to remediate threats identified using the data collection and analytics methods described above. In situations where remediation is to be performed, a remediation device may be provided with instructions to remediate the threat based on analytics results. As described above, a variety of threats and remedial actions may be handled by the network threat handling device.

The foregoing disclosure describes a number of example implementations for handling network threats. As detailed above, examples provide a mechanism for initiating data collection and analytics based on information about potential threats, e.g., using predefined playbooks, and potential applications of a system that is capable of handling threats in this manner.

We claim:

1. A non-transitory machine-readable storage medium encoded with instructions executable by a hardware processor of a computing device for handling network threats, the machine-readable storage medium comprising instructions to cause the hardware processor to:
   receive, from a threat detector, threat data associated with a particular client device included in a plurality of client devices;
   identify, based on the threat data, a responsive playbook from a plurality of predefined playbooks, wherein each of the plurality of predefined playbooks includes instructions for handling threat data and the responsive playbook specifies a particular analytics operation for assisting with remediation of a threat identified from the threat data;
   identify, from the responsive playbook, additional data for performing the particular analytics operation, wherein the additional data is a type of data that the plurality of network devices were not collecting at the time of receipt of the threat data;
   reconfigure at least one of a plurality of software defined network devices, the reconfiguration causing each reconfigured device to i) collect the additional data, and ii) provide the additional data to an analytics device;
   receive, from the analytics device, particular analytics results from the particular analytics operation;
   identify, based on the particular analytics results, a second playbook for addressing the threat when the particular analytics results are insufficient to determine whether the threat is an actual threat, wherein the second playbook is different from the responsive playbook;
   reconfigure a second time at least one of the plurality of software defined network devices, wherein the second reconfiguration causes each reconfigured device from the second time to i) collect secondary data specified by the second playbook, and ii) provide the secondary data to the analytics device;
   receive second analytics results from the analytics device;
   provide a remediation device with instructions to remediate the threat, wherein the instructions are based on the particular analytics results and the second analytics results; and
   cause the reconfigured devices to stop the collection of the additional data and secondary data after the threat has been successfully remediated.

2. The non-transitory machine-readable storage medium 1, wherein the particular analytics operation includes a determination of a likelihood that the additional data supports a pattern of communications associated with a particular type of malware.

3. The non-transitory machine-readable storage medium 1, wherein the additional data includes one or more of the following: a web proxy log, a user activity log, a network sample, or a counter associated with the particular client device.

4. The non-transitory machine-readable storage medium 1, wherein the secondary data includes one or more of the following: a web proxy log, a user activity log, a network sample, or a counter associated with another one of the plurality of the client devices.

5. The non-transitory machine-readable storage medium 1, wherein remediation of the threat includes configuration of one of the plurality of software defined network devices to halt outgoing traffic from the particular client device.

6. A computing device for handling network threats, the computing device comprising:
   a hardware processor; and
   a data storage device storing instructions that, when executed by the hardware processor, cause the hardware processor to:
   receive, from a threat detector, threat data associated with a particular client device included in a plurality of client devices;
   identify, based on the threat data, a responsive playbook from a plurality of predefined playbooks, wherein each of the plurality of predefined playbooks includes instructions for handling threat data and the responsive playbook specifies a particular analytics operation for assisting with remediation of a threat identified from the threat data;
   identify, from the responsive playbook, additional data for performing the particular analytics operation, wherein the additional data is a type of data that the plurality of network devices were not collecting at the time of receipt of the threat data;
   reconfigure at least one of a plurality of software defined network devices, the reconfiguration causing each reconfigured device to i) collect the additional data, and ii) provide the additional data to an analytics device;
   receive, from the analytics device, particular analytics results from the particular analytics operation;
   identify, based on the particular analytics results, a second playbook for addressing the threat when the particular analytics results are insufficient to determine whether the threat is an actual threat, wherein the second playbook is different from the responsive playbook;
   reconfigure a second time at least one of the plurality of software defined network devices, wherein the second reconfiguration causes each reconfigured device from the second time to i) collect secondary data specified by the second playbook, and ii) provide the secondary data to the analytics device;
   receive second analytics results from the analytics device;

provide a remediation device with instructions to remediate the threat, wherein the instructions are based on the particular analytics results and the second analytics results; and cause the reconfigured devices to stop the collection of the additional data and secondary data after the threat has been successfully remediated.

7. The computing device of claim 6, wherein the particular analytics operation includes a determination of a likelihood that the additional data supports a pattern of communications associated with a particular type of malware.

8. The computing device of claim 6, wherein the additional data includes one or more of the following: a web proxy log, a user activity log, a network sample, or a counter associated with the particular client device.

9. The computing device of claim 6, wherein the secondary data includes one or more of the following: a web proxy log, a user activity log, a network sample, or a counter associated with another one of the plurality of the client devices.

10. The computing device of claim 6, wherein remediation of the threat includes configuration of one of the plurality of software defined network devices to halt outgoing traffic from the particular client device.

11. A method for handling network threats, implemented by a hardware processor, the method comprising:

receiving, from a threat detector, threat data associated with a particular client device included in a plurality of client devices;

identifying, based on the threat data, a responsive playbook from a plurality of predefined playbooks, wherein each of the plurality of predefined playbooks includes instructions for handling threat data and the responsive playbook specifies a particular analytics operation for assisting with remediation of a threat identified from the threat data;

identifying, from the responsive playbook, additional data for performing the particular analytics operation, wherein the additional data is a type of data that the plurality of network devices were not collecting at the time of receipt of the threat data;

reconfiguring at least one of a plurality of software defined network devices, the reconfiguration causing each reconfigured device to i) collect the additional data, and ii) provide the additional data to an analytics device;

receiving, from the analytics device, particular analytics results from the particular analytics operation;

identifying, based on the particular analytics results, a second playbook for addressing the threat when the particular analytics results are insufficient to determine whether the threat is an actual threat, wherein the second playbook is different from the responsive playbook;

reconfiguring a second time at least one of the plurality of software defined network devices, wherein the second reconfiguration causes each reconfigured device from the second time to i) collect secondary data specified by the second playbook, and ii) provide the secondary data to the analytics device;

receiving second analytics results from the analytics device;

providing a remediation device with instructions to remediate the threat, wherein the instructions are based on the particular analytics results and the second analytics results; and causing the reconfigured devices to stop the collection of the additional data and secondary data after the threat has been successfully remediated.

12. The method of claim 11, wherein the particular analytics operation includes a determination of a likelihood that the additional data supports a pattern of communications associated with a particular type of malware.

13. The method of claim 11, wherein the additional data includes one or more of the following: a web proxy log, a user activity log, a network sample, or a counter associated with the particular client device.

14. The method of claim 11, wherein the secondary data includes one or more of the following: a web proxy log, a user activity log, a network sample, or a counter associated with another one of the plurality of the client devices.

15. The method of claim 11, wherein remediation of the threat includes configuration of one of the plurality of software defined network devices to halt outgoing traffic from the particular client device.

* * * * *